No. 787,763. PATENTED APR. 18, 1905.
W. H. HUNDREDMARK.
CULTIVATOR.
APPLICATION FILED AUG. 20, 1904.
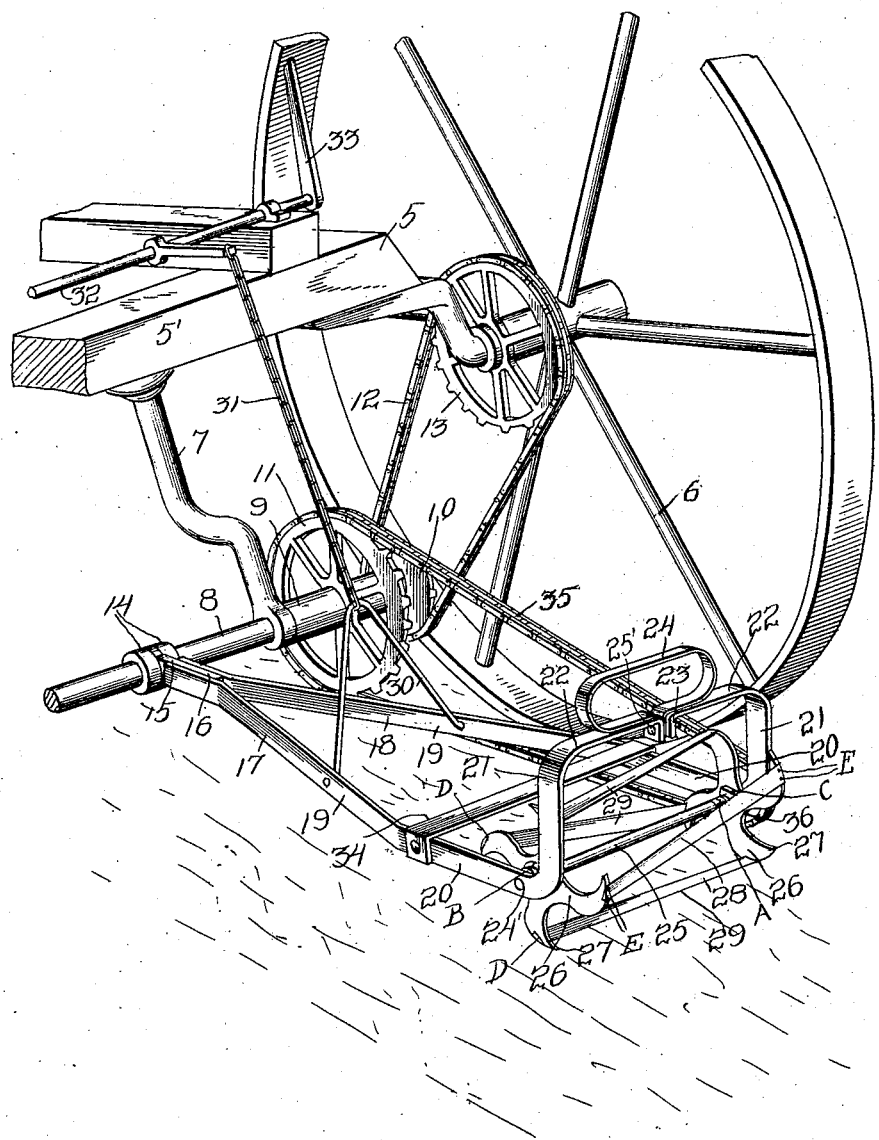
Witnesses
O. K. Reichenbach
E. M. Colford
Inventor
W. H. Hundredmark.
by Chandler & Chandler
Attorneys No. 787,763.

Patented April 18, 1905.

UNITED STATES PATENT OFFICE.

WILLIAM H. HUNDREDMARK, OF CALEDONIA, MINNESOTA.

CULTIVATOR.

SPECIFICATION forming part of Letters Patent No. 787,763, dated April 18, 1905.

Application filed August 20, 1904. Serial No. 221,527.

*To all whom it may concern:*

Be it known that I, WILLIAM H. HUNDREDMARK, a citizen of the United States, residing at Caledonia, in the county of Houston, State of Minnesota, have invented certain new and useful Improvements in Cultivators; and I do hereby declare the following to be a full, clear, and exact description of the invention, such as will enable others skilled in the art to which it appertains to make and use the same.

This invention relates to cultivators, and has for its object to provide a simple and efficient cultivator which will embody few parts and which may be manufactured at a low cost, a further object being to provide an implement of this nature which will be so constructed as to insure thorough cultivation of the ground and removal of all weeds and other undesirable growth.

Other objects and advantages will be apparent from the following description, and it will be understood that modifications of the specific construction shown may be made and any suitable materials may be used without departing from the spirit of the invention.

In the drawing forming a portion of this specification there is shown a perspective view of a portion of the cultivator.

Referring now to the drawing, the present invention comprises a frame 5, including a main transverse beam 5' and having wheels 6. Depending from the beam 5', adjacent to its end, are brackets 7, in which there is mounted a transverse shaft 8, the ends of which project outwardly beyond the brackets and have revolubly mounted thereon sleeves 9, each of which carries at its outer end a sprocket 10, other sprockets, 11, being mounted upon the sleeves between the sprockets 10 and the inner ends thereof, and the sprockets 10 are connected, by means of chains 12, to sprockets 13, carried by the wheels 6, these sprockets being provided with the usual compensating mechanism to permit of turning the implement. The shaft 8 is fixed in the brackets 7, and adjacent to the brackets the shaft is provided with pairs of spaced collars 14, between which are disposed plates 15, having openings therein with which the shaft is engaged, the plates being thus movable pivotally upon the shaft. The plates 15 have rearwardly-extending portions 16, and secured against the faces of each of these portions are a pair of metallic plates 17 and 18, which extend rearwardly and which have divergent portions 19, beyond which they are turned to form parallel spaced portions 20, at the ends of which the plates are turned upwardly and then inwardly toward each other to form vertical portions 21 and horizontal portions 22, the inner ends of the latter being turned downwardly, as shown at 23, and having secured therebetween the ends of a metallic loop 24, the loop being held in position by a bolt 25' passed through perforations in its ends and through perforations in the portions 23 of the plates. Adjacent to their rearward ends the portions 20 of the plate are provided with alining openings 24', in which are journaled the ends of a shaft 25, it being understood that each of the pairs of plates 17 and 18 is provided with one of these shafts.

Loosely mounted adjacent to the ends of each of the shafts 25, inwardly of the plates 17 and 18, are a pair of spider-plates 26, the arms thereof having their extremities turned in the same direction and sharpened, as shown at 27, and the arms of the plate at one end of each shaft are disposed opposite to the spaces between the arms of the plate at the other end of the shaft, so that the arms of one plate are in advance of those of the other, and the arms of each pair of plates are connected in pairs by blades 28, which are disposed with their cutting edges 29 in the direction of rotation of the spider-plates. Each of the shafts 25 is provided with disks B at its ends between the plates 17 and 18 and the spider-plates 26, these disks being rigidly secured to the shaft. Inwardly of the disks B the shafts 25 are provided with threads A, with which are engaged nuts C, by means of which the spider-plates 26 may be clamped against the disks B. The knives 28 have their ends disposed in slots D in the arms of the spider-plates and are held in such position by screws E, which clamp against the blades, as illustrated. There are thus provided two spaced cultivating members arranged to lie one at each side of a corn-row as the implement is driven through a field, and pivoted between each pair of the plates 17 and 18 is a yoke 30, which extends upwardly and is connected, by means of a chain 31, with a rock-shaft 32, having an actuating hand-lever 33, and by means of the hand-lever the rock-shaft may be operated to raise or lower the cultivating members. Secured at its ends to the portions 20 of each pair of plates 17 and 18 is a transverse brace 34. It will thus be apparent that as the implement is driven through a field, as mentioned above, the shafts 25, which are connected with the sprocket-wheels 11 by means of chains 35, engaged with these sprocket-wheels, and with sprocket-wheels 36, carried by the outer ends of the shafts 25, will be revolved, and the blades 28 coming in contact with the ground will loosen the latter and will cut any weeds or other growth between the corn-rows. An implement is thus provided which pulverizes all clods of earth, cuts weeds below the surface of the ground, thus injuring the roots and preventing them from sprouting, and which leaves the ground level, thus preventing washing by rains. The blades 28 are so thin that they are practically self-sharpening, and they may be readily removed, as described, when broken or worn.

The seat of the implement extends rearwardly from the frame 5 and lies in such position that the occupant thereof may insert his feet in the loops 24, and thus guide the cultivating members.

What is claimed is—

In an implement of the class described, the combination with a wheeled frame, of brackets depending from the frame, a shaft rigidly mounted in the brackets, sleeves revolubly mounted upon the shaft, connections between the wheels and the sleeves for rotation of the latter when the wheels are revolved, spaced frames pivotally connected with the shaft between the brackets, said frames comprising rearwardly-extending divergent members, cultivating-bodies revolubly mounted between the rearward ends of the divergent members, connections between the cultivating-bodies and the sleeves for rotation of said bodies when the sleeves are revolved, said second-named frames being arranged to lie normally with their cultivating-bodies in engagement with the ground, and means for moving the second-named frames upon the shaft to bring them out of their normal positions.

In testimony whereof I affix my signature in presence of two witnesses.

WILLIAM H. HUNDREDMARK.

Witnesses:
L. E. WHEATON,
O. P. STEWART.